United States Patent [19]

Isett

[11] 4,046,950

[45] Sept. 6, 1977

[54] CHALCOGENATED TETRACENE ORGANIC METALS

[75] Inventor: Lawrence Clair Isett, Rochester, N.Y.

[73] Assignee: Eastman Kodak Company, Rochester, N.Y.

[21] Appl. No.: 668,116

[22] Filed: Mar. 18, 1976

[51] Int. Cl.$^2$ .............................................. H01B 1/00
[52] U.S. Cl. .................................. 428/411; 252/500; 260/239 R; 260/327 C
[58] Field of Search .................... 252/500; 260/327 C, 260/239 R; 428/411

[56] References Cited

U.S. PATENT DOCUMENTS

| | | | |
|---|---|---|---|
| 3,403,165 | 9/1968 | Matsunaga | 260/327 |
| 3,627,655 | 12/1971 | Perez-Albuerne | 204/158 R |
| 3,629,158 | 12/1971 | Perez-Albuerne | 252/500 |
| 3,634,336 | 1/1972 | Perez-Albuerne | 252/519 |

Primary Examiner—Benjamin R. Padgett
Assistant Examiner—E. Suzanne Parr
Attorney, Agent, or Firm—Arthur H. Rosenstein

[57] ABSTRACT

Organic ion-radical salts having the electrical properties of metals and elements having a layer containing these salts are disclosed. The salts are salts of a chalcogenated tetracene donor compound and an electron acceptor compound wherein the ratio of donor compound to acceptor compound is from about 3:1 to about 1.5:1. These salts have a resistivity less than about $10^{-2}$ ohm-cm at 295° K. The salts are further characterized by a resistivity that decreases with decreasing temperature. A vapor phase process for preparing these organic metals is also disclosed. The process comprises the steps of:

1. forming a first vapor comprising the chalcogenated tetracene compound;
2. forming a second vapor comprising the electron acceptor compound; and
3. reacting the first vapor with the second vapor at a temperature of about 75° C to about 300° C in a substantially inert atmosphere.

20 Claims, 3 Drawing Figures

CHALCOGENATED TETRACENE ORGANIC METALS

FIELD OF THE INVENTION

This invention relates to novel organic materials and to a process for their preparation. More particularly, this invention relates to chalcogenated tetracene ion-radical salts having metallic electrical properties.

DISCUSSION OF THE PRIOR ART

Many organic compounds are known to have semiconducting properties. These compounds characteristically have a conductivity in the range of $10^2$ to $10^{-9}$ (ohm-cm)$^{-1}$. Recently, several organic compounds have been discovered which have higher conductivity. These compounds are considered to be metals or metal-like in that they have a conductivity greater than $10^2$ (ohm-cm)$^{-1}$ and further because their conductivity increases with decreasing temperature. In a typical semiconductor, the concentration of electrons and hence conductivity is dependent on the presence of thermally excited electrons. Thus, the conductivity in a semiconductor decreases with decreasing temperature according to a Boltzmann-type relationship. The resistivity of an ordinary semiconductor compound may be described by the formula:

$$\rho = \rho_o \exp(E_a/kT)$$

where $\rho$ is the resistivity; $\rho_o$ is a constant; $E_a$ is the activation energy required to free an electron; $k$ is Boltzmann's constant; and $T$ is the absolute temperature (see U.S. Pat. No. 3,433,165). By contrast, a metal depends on the presence of delocalized electrons for conductivity and therefore, the conductivity increases with decreasing temperature as the electrical resistance due to scattering of electrons by lattice vibrations is decreased.

The general requirements for the design and synthesis of organic metals are set forth by Garito and Heeger in *Accounts of Chemical Research*, 7,232 (1974). If the unpaired electrons delocalize over all the electron sites in the compound, the compound attains a metallic state. If, on the other hand, the electrons localize on individual sites the compound may be an insulator or at best a semiconductor. To attain the metallic state Garito and Heeger set forth three basic criteria:
1. the existence of unpaired electrons;
2. a uniform crystal structure; and
3. relatively weak electron-electron repulsive interactions. In spite of these general guidelines, it is extremely difficult to predict in advance which compounds are going to have metallic properties. The second criteria is the most difficult to achieve because of the unpredictability of the crystalline structure of organic compounds. For example, compounds of N-methyl-phenazinium-tetracyanoquinodimethane can exist as two structures which differ only in the location of the ion radicals within the structure (L. B. Coleman, S. K. Khanna, A. F. Garito, A. J. Heeger and B. Morosin, *Physics Letters*, 42A, (1), 15 (1972). The conductivity of these two compounds, which are stoichiometrically identical, may differ by as much as six orders of magnitude.

There are only a limited number of organic compounds which are known to have the electrical properties of a metal. These compounds are ion-radical salts. The term "ion-radical salt" as used herein refers to a complex of an electron donating species and an electron accepting species in which the species are in an ionized form in the ground state of the complex. Ion-radical salts are also known in the art as "dative-type charge-transfer salts" and sometimes simply "charge-transfer salts". These compounds are formed by the transfer of electrons between a donor compound and an acceptor compound.

Most of the known organic metals are based on tetracyanoquinodimethane (TCNQ) as the acceptor compound with tetrathiofulvalene (TTF), tetraselenofulvalene (TSF), hexamethylenetetraselenofulvalene (HMTSF) and other substituted TTF and TSF molecules as electron donor compounds. The TTF-TCNQ family of compounds suffer several disadvantages when used as conductors. Most importantly, TTF-type molecules are extremely difficult to synthesize. Thus, compounds of the TTF-type, having the required purity, are extremely expensive. Further, the known TTF-TCNQ type of compound is relatively unstable. For example, the ratio $\rho(60\ K)/\rho(300\ K)$ is observed to be a sensitive indicator of sample quality in TTF-TCNQ. Crystals of TTF-TCNQ measured several months after synthesis exhibit values of $\rho(60\ K)/\rho(300\ K)$ considerably smaller than crystals measured immediately after synthesis, indicating instability of the material.

Various tetracene-related compounds are known in the art. However, known compounds from this family are semiconductors rather than metals. In U.S. Pat. No. 3,403,165, Matsunaga describes semiconducting tetrathiotetracene compounds. Matsunaga describes the temperature dependence of the resistivity of his compounds as following the usual exponential relationship for semiconductor compounds described above. Of the compounds of Matsunaga, those demonstrating the lowest resistivities with highest thermal stabilities are represented by the formula:

$$[D]_3[A]_n$$

where the donor compound D is tetrathiotetracene and A is selected from o-chloranil, o-bromanil and o-iodanil and tetracyanoethylene. The integer $n$ is defined as 1 except when A is tetracyanoethylene in which case $n$ is 2. The Matsunaga patent is directed to semiconductors and does not describe metallic compounds.

In U.S. Pat. No. 3,629,158, E. A. Perez-Albuerne describes certain chalcogenated tetracene ion-radical salts. Again, all of these salts are semiconductor compounds and do not have the conductivity or the conductivity-temperature dependence of metals. The donor compound of Perez-Albuerne can be tetrathiotetracene and the electron acceptor compound can be any of a large number of anion-forming species. Other patents of Perez-Albuerne describing similar materials include U.S. Pat. Nos. 3,634,336 and 3,627,655.

There is a great need for relatively stable, inexpensive organic compounds which have the electrical properties of metals. While several organic metals and numerous organic semiconductors are known in the art, at the present stage of development no organic compound has all of these desired properties.

STATEMENT OF THE INVENTION

I have found that certain ion-radical salts of a chalcogenated tetracene have the electrical properties of a metal when the molar ratio of chalcogenated tetracene to acceptor compound is in the range from about 3:1 to about 1.5:1. Compounds of the invention have an electric resistivity at 295° K that is less than about $10^{-2}$ ohm-cm. These compounds are further characterized in that their resistivity decreases with decreasing temperature according to the formula $$\rho = \rho_o + CT^2$$

where $\rho$ is the resistivity, $\rho_o$ and $C$ are constants which depend on the particular compound, and $T$ is the absolute temperature. This form of the temperature dependence of the resistivity is characteristic of known organic metals (see S. Etemad, T. Penney, E. M. Engler, B. A. Scott and P. E. Seiden, *Phys. Rev. Lett.* 34 (12), 741 (1975) and S. N. Bloch et al, *Phys. Rev. Lett.* 34 (25) 1561 (1975)) and of transition metals at low temperatures (see N. V. Volkenshtein, V. P. Dyakina and V. E. Startsev, "Scattering Mechanisms of Conduction Electrons in Transition Metals at Low Temperatures", *Phys. Stat. Sol.* 657, 9, (1973)). Such a temperature dependence is predicted by theory for an electron-electron scattering (see C. Kittel, *Introduction to Solid State Physics*, 3rd. Ed., 238 (1966, J. Wiley, NY)).

In another aspect, I provide an element comprising a support having thereon a layer containing the chalcogenated tetracene metallic ion-radical salts of the invention. In still another aspect, I provide a novel vapor phase process for the preparation of these compounds which comprise the steps of 1. forming a first vapor comprising the tetracene donor compound;
2. forming a second vapor comprising the acceptor compound; and
3. reacting the first vapor with the second vapor at a temperature of about 75° C to about 300° C in a substantially inert atmosphere.

DETAILED DESCRIPTION OF THE INVENTION

Figure 1:
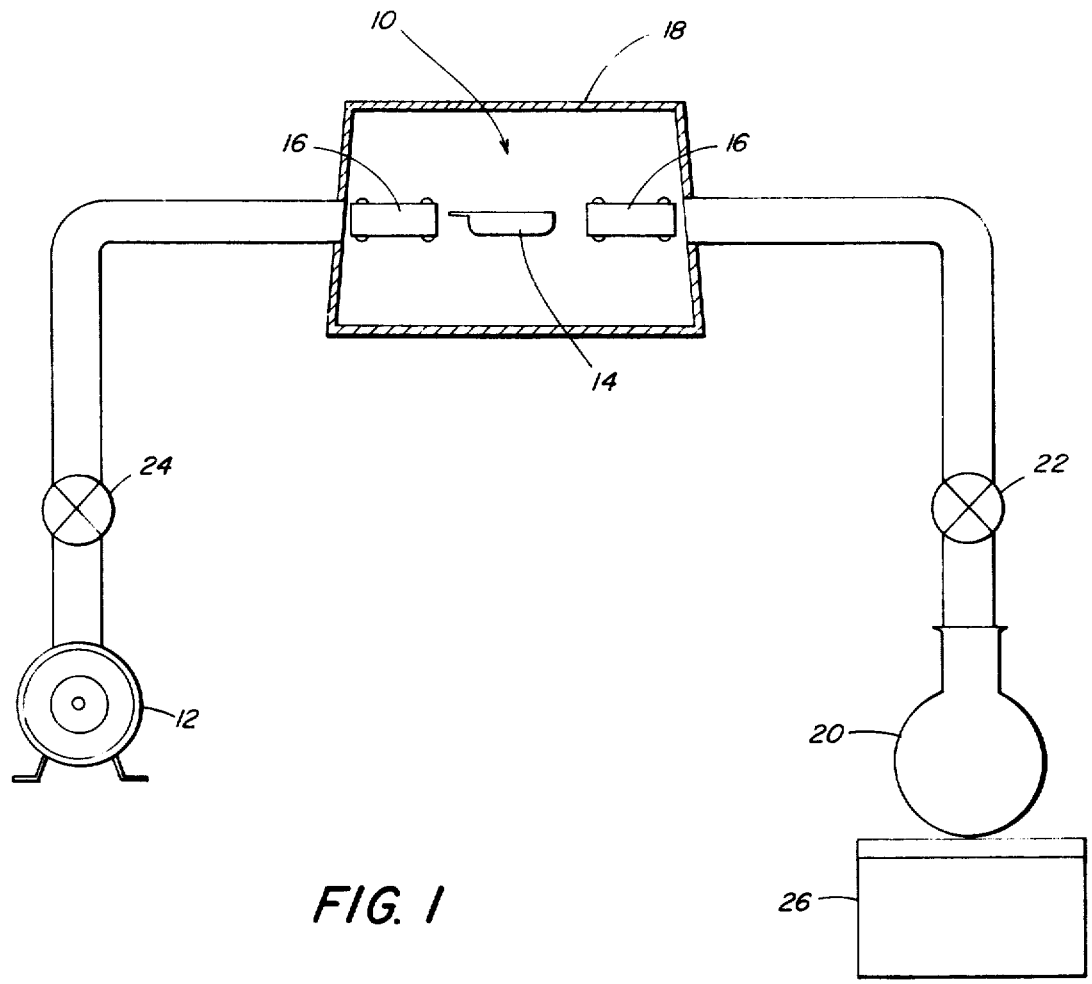
FIG. 1 is a schematic representation of an apparatus useful for the process of the present invention.

As mentioned above, the organic metal compounds of the present invention are chalcogenated tetracene ion-radical salts wherein the ratio of chalcogenated tetracene donor compound to electron acceptor compound is about 3:1 to about 1.5:1. The preferred ratio is 2:1. Chalcogenated tetracenes include tetrathiotetracene, tetraselenotetracene and tetratellurotetracene.

The acceptor compound may be any of a wide variety of compounds which are capable of forming an ion-radical salt with a chalcogenated tetracene and which results in an organic compound whose resistivity decreases with decreasing temperature. Thus, the acceptor compound may be any element or compound having enough oxidizing power to produce the chalcogenated tetracene ion radical. Preferred acceptor compounds include halogen compounds, particularly iodine.

Compositions of matter within the scope of the present invention include compounds having the formula:

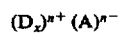

wherein $(D_x)^{n+}$ is a chalcogenated tetracene complex cation selected from the group consisting of complex cations of tetrathiotetracene, tetraselenotetracene and tetratellurotetracene, and A is an anion selected from the group consisting of a. an inorganic anion selected from the group consisting of $Br_3^-$, $I_3^-$, $F^-$, $Cl^-$, $Br^-$, $I^-$, $SCN^-$, nitrate, sulfate, phosphate, fluoroborate, ferricyanide, molybdate, tungstate and the like; and b. an organic anion derived from an organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from 5 to 6 atoms in the heterocyclic nucleus and having at least one hetero atom selected from the group consisting of a nitrogen, oxygen or sulfur atom; a monohydric phenol, a polyhydric phenol and p-toluenesulfonate and the like. The above organic anions may also be attached to polymeric backbones.

$x$ represents the molar ratio of D to A and has a value between about 3:1 and about 1.5:1 and is preferably about 2:1;

$n$ is an integer between 1 and 5 and is preferably one or two.

The term "complex cation", represented by the symbol $(D_x)^{n+}$, is defined as a group of chalcogenated tetracene moieties (D) taken $x$ times. To this group a positive charge of value $n+$ is balanced with one anion of charge $n-$ to achieve charge neutrality. The values of $n$ are restricted to integers but $x$ may be integers or non-integers such that $n+$ and $n-$ are balanced.

The chalcogenated tetracene compounds are well known in the art and may be prepared by any of several processes. Particularly useful processes for preparing chalcogenated tetracene compounds are described in U.S. Pat. No. 3,723,417 of E. A. Perez-Albuerne and in C. Marchalk, *Bull. Soc. Chim. France*, 19, 800 (1952).

As mentioned previously, the term "organic metal" refers to organic compounds which behave as metals, that is, they are compounds which have an electrical conductivity greater than $10^2$ reciprocal ohm-cm at 295° K and whose conductivity increases with decreasing temperature. The organic metals of the present invention are further characterized in that their spin magnetic susceptibility is only very weakly dependent on temperature. The temperature independent spin magnetic susceptibility of the compounds of the present invention is attributed to delocalized electrons yielding the temperature independent Pauli spin paramagnetism that is a characteristic of a metal. By comparison, the spin magnetic susceptibility of a semiconductor compound such as described in the Perez-Albuerne patents and the Matsunaga patent increases with decreasing temperature as a result of the localization of the electrons. A discussion of the measurement of spin magnetic susceptibility may be found in C. Kittel, *Introduction to Solid State Physics*, (3rd Ed.) John Wiley, N.Y., (1966), p. 446, and J. M. Ziman, *Principles of the Theory of Solids*, Cambridge University Press, London, (1972) p. 332.

The room temperature conductivity and other electrical properties of the compounds of the present invention can vary depending on the specific donor compound and acceptor compound. Typically, the conductivity of the compounds at 295° K is in the range of about $10^2$ to about $10^4$ reciprocal (ohm-cm)$^{-1}$, although higher conductivities are possible. Illustrative of the conductivity of these compounds is the conductivity of (tetrathiotetracene$_2$)+ (I$_3$)− which is about 1000 (ohm-cm)$^{-1}$ at 295° K. The conductivity of this compound increases with decreasing temperature and is about 2700 (ohm-cm)$^{-1}$ at 85° K.

As used herein, conductivity is measured on the single crystal of the compound using the four-probe method. The four-probe method is well known in the art and consists of attaching four electrodes to a single crystal of the compound whose conductivity is to be measured. Compounds grown by the vapor phase method such as described herein may be needle-like single crystals having a length of about 1 mm to about 4 mm, although other sizes may also be grown. An electrode is attached to either end of the needle-like crystal while two electrodes are attached near the middle of the crystal. The electrodes may be attached by any method known in the art. For example, a colloidal suspension of graphite in polystyrene may be "painted" on a portion of the crystal and a copper wire imbedded therein to form the electrode. Current is passed between the two end electrodes while the voltage drop is measured across the two middle electrodes. Using this method, the effect of the electrode resistance is greatly reduced. A discussion of the four-probe method as used herein may be found in *Phys. Rev. B7*, 2122 (1973).

The compounds of the present invention may exist in several different forms. Large single crystals having anisotropic electrical conductivity and optical properties may be prepared. The compounds may also be in the form of powders or thin transparent films. Because of their high degree of optical anisotropy, these compounds may be useful in a variety of applications. An anisotropic single crystal or assembly of oriented microcrystals may be used in optical devices such as polarizers. Because of their high conductivity these compounds may be useful in a wide variety of applications. The powders may be coated in layers so as to serve as antistatic layers for photographic elements and the like. Thin films of the compounds of the present invention similarly may be used as antistatic layers for photographic elements. Thin films may also be used as conducting electrodes for electrophotographic elements, for photovoltaic devices and the like. These compounds are particularly useful because their electrical properties do not substantially change on extended exposure to ambient conditions.

Therefore, because of these advantageous properties, another aspect of the present invention is an element comprising a support having thereon a layer containing the organic metals of the present invention. The organic metal may be directly deposited on the support in the form of a thin film by the vapor phase process of the present invention or the powder form of the compound may be dispersed in a binder which may then be coated on the support.

When the organic metal is to be dispersed in a binder, the binder should be chosen so as not to affect the electrical properties of the organic metal. Any of a wide variety of film-forming materials are suitable. Suitable binders include: natural resins including gelatin, cellulose ester derivatives and the like; vinyl resins including polyvinyl esters, vinyl chloride and vinylidene chloride polymers, styrene polymers such as polystyrene and the like, methacrylic acid ester polymers, polyolefins, poly(vinyl acetals), poly(vinyl alcohol); polycondensates including polyesters, polyamides, ketone resins, phenolformaldehyde resins and the like; silicon resins; and alkyd resins such as styrene-alkyd resins, silicone-alkyd resins, soya-alkyd resins and the like.

The organic metal is typically mixed with the binder and solvent to form the coating composition. The organic metal-binder-solvent coating composition is typically coated on the support and the solvent is evaporated leaving an organic metal-binder layer coated on the support. The solvent is chosen so that the binder is soluble therein. Typical solvents include alcohols including aliphatic alcohols, aromatic alcohols, polyhydric alcohols, substituted alcohols, ketones, chlorinated hydrocarbons, aromatic hydrocarbons, organic carboxylic acids, substituted carboxylic acids, lower dialkylsulfoxides and water. Mixtures of these solvents may also be used. Preferred solvents are alcohols, ketones, chlorinated solvents, water, and the like.

In preparing the elements of the present invention using the organic metal with a binder, useful results are obtained wherein the organic metal is present in an amount equal to at least about 10 weight percent of the coated layer. The upper limit for the amount of organic metal present varies widely. The organic metal may comprise up to about 100 weight percent of the coated layer. A preferred weight range for the organic metal is from about 20 weight percent to about 90 weight percent. Coated thickness of the organic metal-binder layer on the support can vary widely. Typically, the dry coating has a thickness of about 0.05 μm to about 5 μm, however, coatings having a thickness outside of this range are also useful. A preferred range for the thickness of the layers of the present invention comprising a binder is about 0.1 μm to about 1 μm. Because of the high conductivity of the compounds of the present invention, thin films (binderless films generally formed in situ) can be thin enough to be essentially transparent and still provide useful conductivity. Typically, the thin films have a thickness range of about 0.005 μm to about 5 μm, however, coatings outside of this range are also useful. The preferred range of the coating thickness of the thin films is from about 0.01 μm to about 1 μm.

The organic metal-containing layers may be coated on any of a wide variety of suitable substrates. Illustrative substrates include fibers, films, glass, paper, metals and the like.

As mentioned previously, the elements of the present invention are useful in preparing a wide variety of articles of manufacture. For example, one such use is in anti-static photographic film elements comprising an inert film support (which may carry a subbing layer to improve adhesion), a conducting layer containing one of the organic metals described herein and a silver halide emulsion layer which is sensitive to electromagnetic radiation. These layers can be arranged having the conducting layer and the emulsion layer on each side of the support, and also both layers can be on the same side, with either one on top of the other. In some cases, it is desirable to include additional layers of insulating polymer which can be incorporated into the element, either below, between or above any of the above-mentioned layers.

Another use is in anti-static magnetic tape, comprising the same arrangement of layers as in the above-described photographic film element, with the exception that the photographic emulsion is replaced by a suitable layer of magnetic material.

A further use is in a direct electron recording film element comprising an inert insulating film support (which may carry a subbing layer to improve adhesion), a conducting layer containing one of the organic metals described herein and a layer of a silver halide emulsion which is sensitive to electron beams. In this case, both layers are placed on one side of the support with either one on top of the other. Also, additional layers of insulating polymer may be incorporated, as in the preceding elements, to provide particular advantages such as improvement of adhesion, elimination of undesirable changes in the electron-sensitivity of the emulsion, etc.

A fourth use is in electrophotographic elements, comprising a conducting layer which contains one of the organic metals described herein. The conducting layer is coated on an inert support, and on top of the conducting layer is a second layer containing a photoconductor. Additional thin layers of insulating polymers may also be included in this case, as in the preceding elements, which may be located below, between or on top of the conducting and photoconductive layers.

Another use is in the preparation of optically transparent conducting elements. These elements have a conducting layer containing an organic metal described herein applied to an insulating inert support. The thickness of the conductive layer is such that the resultant optical density is not more than about 0.5 in the spectral range from 400 to 700 nm. Such an element is used in the manufacture of anti-static windows for electronic instruments; anti-static lenses for cameras; and other optical devices; transparent heating panels; photographic products; etc.

Static-free woven goods also can contain the organic metals described herein. Fibers containing the organic metal can be incorporated in woven goods as the sole component or mixed with non-conducting fibers.

In electronic components, the organic metal can be applied to an insulating support and shaped in any desired way to give passive electronic components such as resistors or capacitors. Also, the organic metal can be incorporated as part of active components such as rectifiers or transistors.

In another aspect of the present invention there is provided a novel process for the preparation of the chalcogenated tetracene compounds described herein. Using this process, chalcogenated tetracene ion-radical salts may be prepared easily and rapidly with high purity and sample quality. The process comprises the steps of 1. forming a first vapor comprising a chalcogenated tetracene donor compound;
2. forming a second vapor comprising an acceptor compound; and
3. reacting the first vapor with the second vapor at a temperature of about 75° C to about 300° C in a substantially inert atmosphere.

Apparatus for carrying out the process of the present invention may take many forms. For example, a flow type reactor may be provided. In such an apparatus there is a first chamber containing the desired chalcogenated tetracene donor compound and a second chamber containing the desired acceptor compound. These chambers may be evacuated and separately brought to a temperature at which the compound therein forms a vapor. These vapors may be injected into a reaction chamber, either directly or by means of an inert carrier gas, where they react to form the desired product.

DESCRIPTION OF FIG. 1 IN THE DRAWINGS

A preferred process is carried out in a tube furnace shown in FIG. 1. In FIG. 1 there is shown a vacuum chamber 10 which is capable of being evacuated to very low pressures by vacuum pump 12. Vacuum chamber 10 is connected to vacuum pump 12 through valve 24. Typically, the vacuum chamber is evacuated to a pressure below the vapor pressure of the acceptor compound. Inside the vacuum chamber, there is a quartz boat 14 containing the chalcogenated tetracene donor compound. Also in the vacuum chamber there are quartz collecting tubes 16. Heating means 18 surround the vacuum chamber so that the chamber may be heated to the reaction temperature. A receptacle 20 for the acceptor compound is connected to the vacuum chamber 10 through valve 22. The temperature of receptacle 20 may be controlled by means 26 so as to provide control of the vapor pressure of the acceptor compound within the apparatus. Depending on the vapor pressure characteristics of the acceptor compound, means 26 may be heating or cooling means.

To form the compounds of the present invention using the apparatus described above, the vacuum chamber 10 and receptacle 20 are initially evacuated with both valves 22 and 24 open, whereupon valve 24 is closed. The vacuum chamber 10 is then heated by heating means 18 to a temperature above the sublimation point of the chalcogenated tetracene. If necessary, the temperature of receptacle 20 is adjusted so that there is sufficient vapor of the acceptor compound in vacuum chamber 10 to react with the chalcogenated tetracene. The desired product begins to form immediately on the walls of the vacuum chamber 10, the quartz collecting tubes 16 and in quartz boat 14. When the reaction is complete, that is when either all of the chalcogenated tetracene or the acceptor compound is consumed, the temperature of the vacuum chamber 10 is reduced, valve 22 is closed and valve 24 is opened. The apparatus is then reevacuated by vacuum pump 12 to remove excess acceptor compound. Thin films of the compounds of the present invention may also be formed using apparatus similar to that described in detail above. To produce a thin film, a suitable support is included in the vacuum chamber and the compound is deposited on the support. To promote the formation of thin films the support may be kept at a slightly lower temperature than the reactant temperature. Thus, thin films may be formed when the support is kept near a temperature of about 150° C to 200° C when the reactants are at about 200° C to 300° C.

The total pressure during the reaction step may vary over wide ranges. The total pressure may be adjusted by a suitable inert gas such as argon, nitrogen, helium, and the like. The total pressure may be from very low vacuum such as $10^{-5}$ torr and below up to atmospheric pressure. Typically, the rate of reaction decreases somewhat with increasing total pressure and the preferred range is therefore from about $10^{-5}$ torr to about 150 torr. As mentioned previously, reaction between the donor vapor and acceptor vapor occurs between about 75° C to 300° C. Rate of reaction increases with increasing temperature and the preferred temperature range is from about 200° C to 300° C.

As used herein, "substantially inert atmosphere" includes any atmosphere which is substantially free of compounds which will react with the donor compound, the acceptor compound or the organic metal. This criteria is of course met where the donor compound and acceptor compound are the only compounds present, i.e., the atmosphere is otherwise a vacuum. An atmosphere of an inert gas such as argon, nitrogen, helium and the like is also suitable.

The following examples illustrate the invention:

EXAMPLE 1

Tetrathiotetracene was synthesized according to the procedure described in U.S. Pat. No. 3,723,417 and recrystallized from nitrobenzene. The tetrathiotetracene was further purified by two sublimations and was placed in a quartz boat located in the center of a tube furnace as described in FIG. 1. Solid iodine was placed in receptacle 20 while valve 24 was closed and valve 22 was open. The iodine was condensed with liquid nitrogen. Valve 24 was opened and the apparatus was evacuated by an oil diffusion pump 12 to $10^{-5}$ torr and valve 24 was closed. The tetrathiotetracene in the quartz boat 14 was heated to a temperature of 225° C while the iodine receptacle 20 was maintained at room temperature. After the tetrathiotetracene and iodine were consumed, the oven was cooled to 100° C, valve 22 was closed and the apparatus was reevacuated by opening valve 24 and operating the vacuum pump 12. The crystals which had formed in the quartz boat and on the quartz collecting tube which had the composition (tetrathiotetracene$_2$)$^+$ (I$_3$)$^-$ had well formed edges, smooth faces and a brilliant gold metallic luster.

Figure 3:
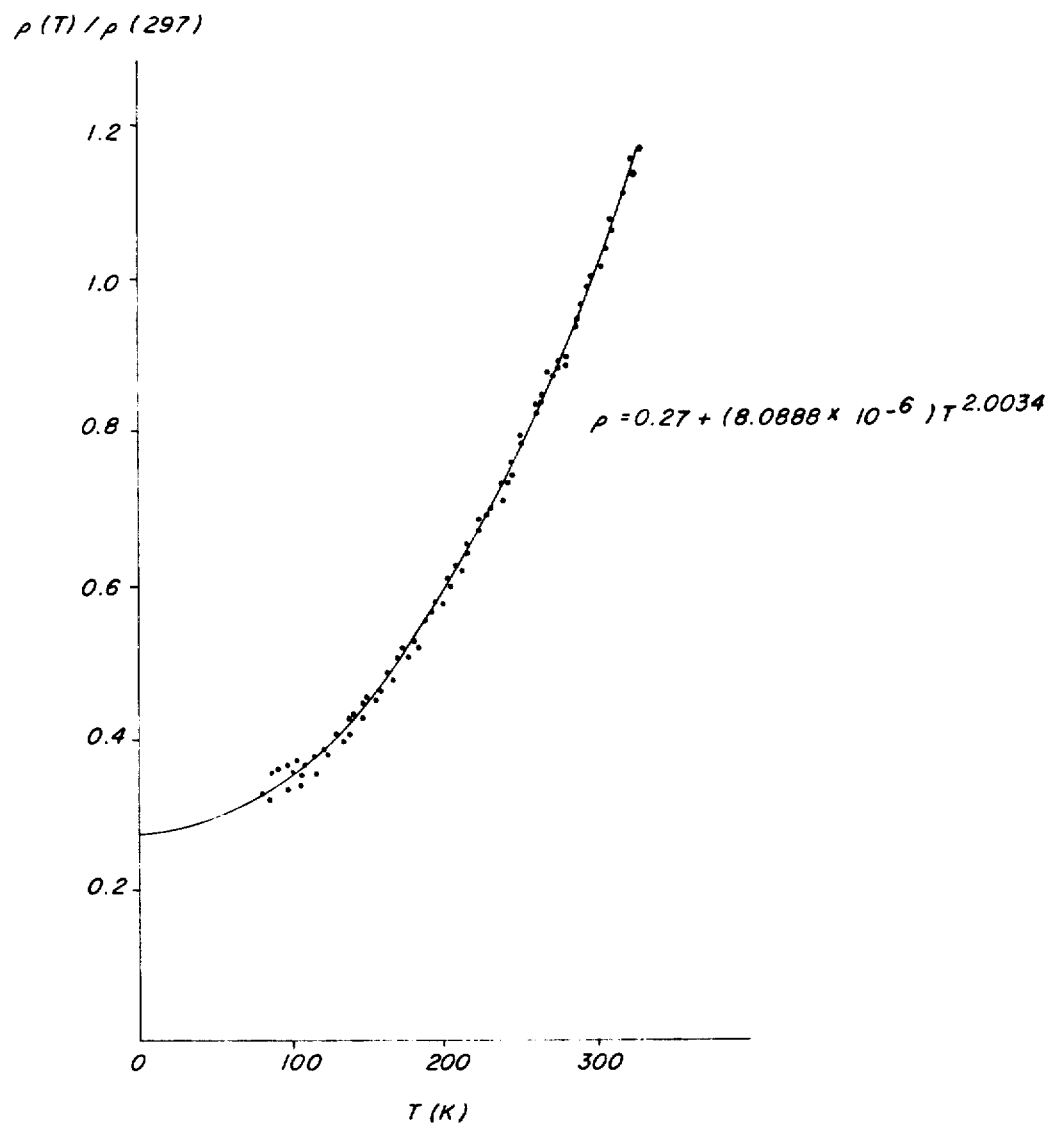
FIG. 3 is a plot of the relative resistivity of a compound of the invention as a function of absolute temperature.

The direct current resistivity of the single crystals which were grown on the quartz collecting tubes 16 was measured along the axis having the highest conductivity using the four-probe technique described above. FIG. 3 shows a plot of the ratio of the resistivity at a given temperature to the resistivity at room temperature versus the temperature in degrees Kelvin. The resistivity generally follows the expression:

$$\text{resistivity} = 0.27 + (8.088 \times 10^{-6})T^2$$

where $T$ is temperature in degrees Kelvin.

EXAMPLE 2

This is a comparative example.

Figure 2:
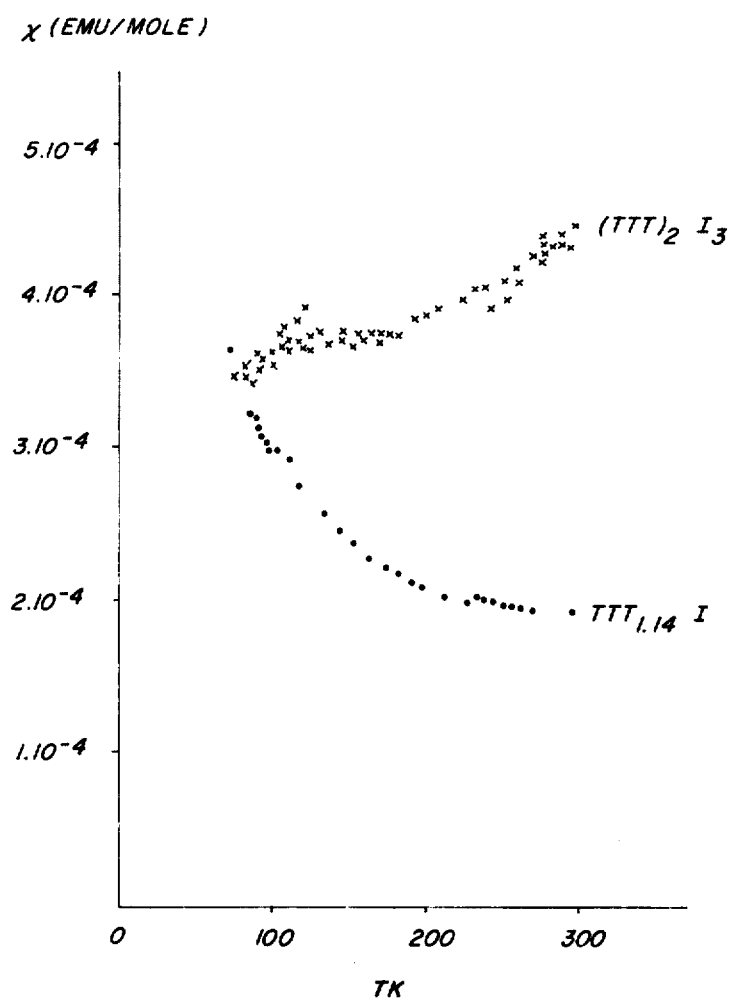
FIG. 2 is a plot of the spin magnetic susceptibility of a compound of the present invention (curve 1) and of a compound of the prior art (curve 2).

The spin magnetic susceptibility of the (tetrathiotetracene$_2$)$^+$ (I$_3$)$^-$ formed in Example 1 was measured as a function of temperature. Similarly, the spin magnetic susceptibility of (tetrathiotetracene)$_{1.14}$ (iodide) as described in U.S. Pat. No. 3,629,158 was also measured as a function of temperature. FIG. 2 is a plot of that data. (Tetrathiotetracene)$_{1.14}$ (iodide) shows the characteristic spin magnetic susceptibility of a semiconductor. That is, the spin magnetic susceptibility increases with decreasing temperature. The spin magnetic susceptibility of (tetrathiotetracene$_2$)$^+$ (I$_3$)$^-$ of the present invention is only slightly dependent on temperature and decreases with decreasing temperature which is characteristic of metallic compounds.

EXAMPLE 3

The resistance using the conventional four-probe technique of a crystal of (tetrathiotetracene$_2$)$^+$ (I$_3$)$^-$ was measured one week after synthesis and found to be 910 (ohm-cm)$^{-1}$ at 290° K and 2800 (ohm-cm)$^{-1}$ at 85° K. After 12 weeks of storage under ambient conditions, the resistance of the same crystal was again measured. It was found to be 910 (ohm-cm)$^{-1}$ at 290° K and 2800 (ohm-cm)$^{-1}$ at 85° K.

Thus, the metallic compounds of this invention are quite stable as compared to the TTF compounds described in *Solid State Communications*, 17, pp 367–372, (1975).

The invention has been described in detail with particular reference to certain preferred embodiments thereof, but it will be understood that variations and modifications can be effected within the spirit and scope of the invention.

I claim:

1. A composition of matter comprising an ion-radical of the formula

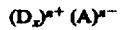

$$(D_x)^{n+} (A)^{y-}$$

wherein $(D_x)^{n+}$ is a chalcogenated tetracene complex cation selected from the group consisting of complex cations of tetrathiotetracene, tetraselenotetracene and tetratellurotetracene and A is an anion selected from the group consisting of
   a. an inorganic anion selected from the group consisting of Br$_3^-$, I$_3^-$, F$^-$, Cl$^-$, Br$^-$, I$^-$, SCN$^-$, nitrate, sulfate, phosphate, fluoroborate, ferricyanide, molybdate, tungstate; and
   b. an organic anion derived from an organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from 5 to 6 atoms in the heterocyclic nucleus and having at least one hetero atom selected from the group consisting of a nitrogen, oxygen, or sulfur atom; a monohydric phenol, and a polyhydric phenol; and
   $x$ represents the ratio of D to A and has a value between about 3 and about 1.5 and
   $n$ is an integer between 1 and 5, said salt having an electrical resistivity less than about $10^{-2}$ ohm-cm at 295° K said resistivity decreasing with decreasing temperature.

2. The composition of matter of claim 1 wherein said chalcogenated tetracene complex cation is tetrathiotetracene.

3. The composition of matter of claim 2 wherein said anion is a halogen.

4. The composition of matter of claim 3 wherein said halogen is iodine.

5. The composition of matter (tetrathiotetracene$_2$)$^+$ (I$_3$)$^-$.

6. An element comprising a support having thereon a layer containing the ion-radical salt of claim 2.

7. An element according to claim 6 wherein said chalcogenated tetracene complex cation of said ion radical salt is tetrathiotetracene.

8. An element according to claim 6 wherein said anion of said ion-radical salt is a halogen.

9. An element according to claim 8 wherein said halogen is iodine.

10. An element according to claim 6 wherein said layer comprises a binder and said ion-radical salt.

11. An element according to claim 6 wherein said ion-radical salt is in the form of a binderless thin film.

12. An element according to claim 11 having a thickness of about 0.05 μm to about 5 μm.

13. An element according to claim 6 wherein said ion-radical salt is (tetrathiotetracene$_2$)$^+$ (I$_3$)$^-$.

14. A process for preparing an ion-radical salt wherein said ion-radical salt is represented by the formula $$(D_x)^{n+} (A)^{n-}$$

wherein $(D_x)^{n+}$ is a chalcogenated tetracene complex cation selected from the group consisting of complex cations of tetrathiotetracene, tetraselenotetracene and tetratellurotetracene and A is an anion selected from the group consisting of
  a. an inorganic anion selected from the group consisting of $Br_3^-$, $I_3^-$, $F^-$, $Cl^-$, $Br^-$, $I^-$, $SCN^-$, nitrate, sulfate, phosphate, fluoroborate, ferricyanide, molybdate, tungstate; and
  b. an organic anion derived from an organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from 5 to 6 atoms in the heterocyclic nucleus and having at least one hetero atom selected from the group consisting of a nitrogen, oxygen, or sulfur atom; a monohydric phenol, and a polyhydric phenol; and $x$ represents the ratio of D to A and has a value between about 3 and about 1.5 and $n$ is an integer between 1 and 5 comprising the steps of
  1. forming a first vapor comprising said chalcogenated tetracene complex cation;
  2. forming a second vapor comprising said anion; and
  3. reacting said first vapor with said second vapor at a temperature of about 75° C to about 300° C in a substantially inert atmosphere.

15. A process according to claim 14 wherein said first vapor and said second vapor are reacted at a temperature of about 200° C to about 300° C.

16. A process according to claim 14 wherein said inert atmosphere comprises an inert gas selected from the group consisting of argon, nitrogen, and helium.

17. A process according to claim 14 wherein said reaction is carried out in a tube furnace.

18. A process according to claim 14 wherein said reaction is carried out in a flow reactor.

19. A process according to claim 14 wherein the total pressure during the reaction step is from about $10^{-5}$ torr to about 150 torr.

20. A process for preparing $(tetrathiotetracene_2)^+$ $(I_3)^-$ comprising the steps of:
  1. forming a vapor of tetrathiotetracene;
  2. forming a vapor of iodine; and
  3. reacting the tetrathiotetracene vapor with the iodine vapor at a temperature of about 225° C in a vacuum.

* * * * *